United States Patent [19]
Barnard

[11] 3,721,256
[45] March 20, 1973

[54] FLOW CONTROL DEVICE WITH A BISTABLE FLUID SWITCH

[75] Inventor: Daniel D. Barnard, Birmingham, Mich.

[73] Assignee: The Bendix Corporation, Southfield, Calif.

[22] Filed: Sept. 30, 1970

[21] Appl. No.: 76,868

[52] U.S. Cl..............................137/805, 137/409
[51] Int. Cl..............................F15c 1/10, F15c 3/04
[58] Field of Search..............................137/81.5, 409

[56] References Cited

UNITED STATES PATENTS

| | | | |
|---|---|---|---|
| 3,654,957 | 4/1972 | Fichter | 137/81.5 X |
| 3,467,122 | 9/1969 | Jones | 137/81.5 |
| 3,563,259 | 2/1971 | Jones | 137/81.5 |
| 3,441,066 | 4/1969 | Wilhere | 137/81.5 X |
| 3,516,455 | 6/1970 | Carter | 137/81.5 X |
| 3,538,931 | 11/1970 | Blosser et al. | 137/81.5 |

Primary Examiner—William R. Cline
Attorney—John R. Benefiel and Plante, Hartz, Smith and Thompson

[57] ABSTRACT

A flow control device which senses the liquid level in a tank filled thereby and automatically shuts off flow upon reaching a predetermined tank level by means of a fluidic sensing and control circuit. A bistable fluid switch is used to initiate the automatic filling operation, and also to discontinue supply flow to the control circuit after performance of its sensing and control function. The sensing and control circuit includes a monostable jet-on-jet fluid amplifier with a power jet which is switched to an alternate outlet by a sensing line disposed in the tank with floats adapted to block the sensing line upon attainment of the predetermined level, the output of the alternate outlet causing operation of a main flow control valve to discontinue further flow, as well as to operate the bistable fluid switch to discontinue supply flow to the fluid amplifier.

16 Claims, 7 Drawing Figures

INVENTOR
DANIEL D. BARNARD
BY John R Benefiel
ATTORNEY

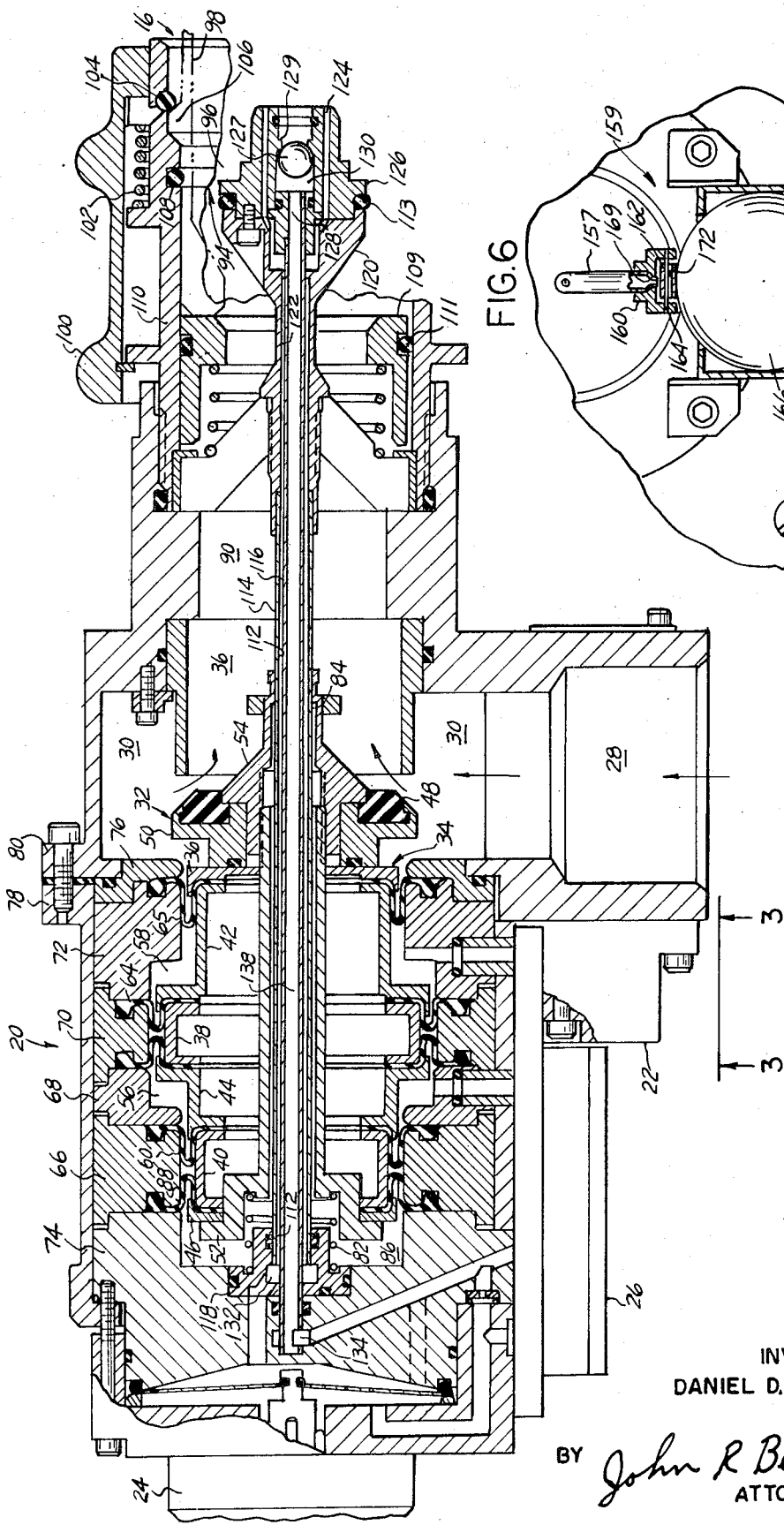
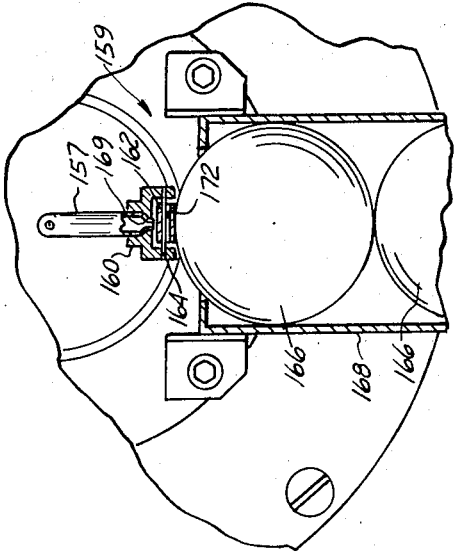

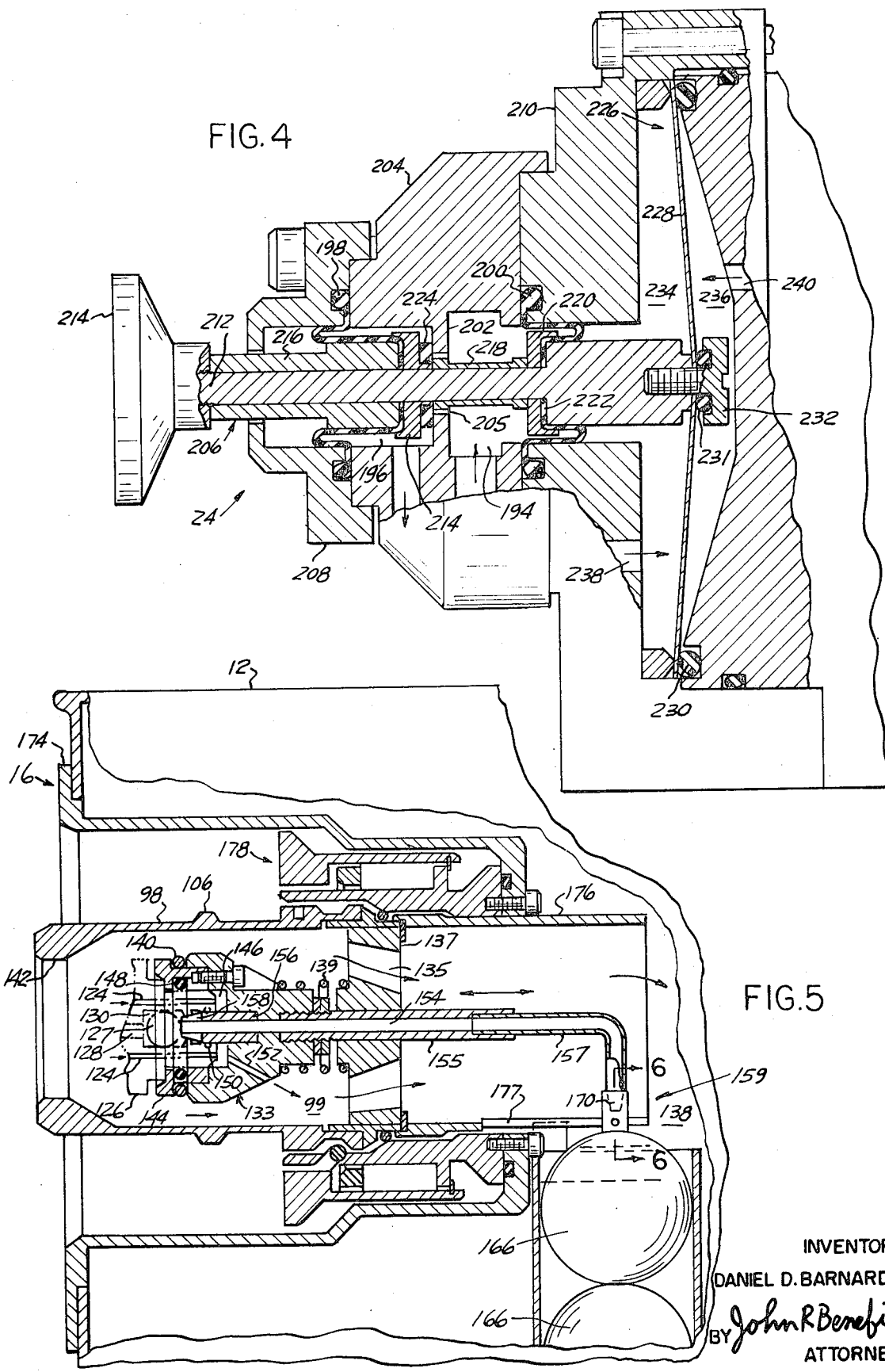

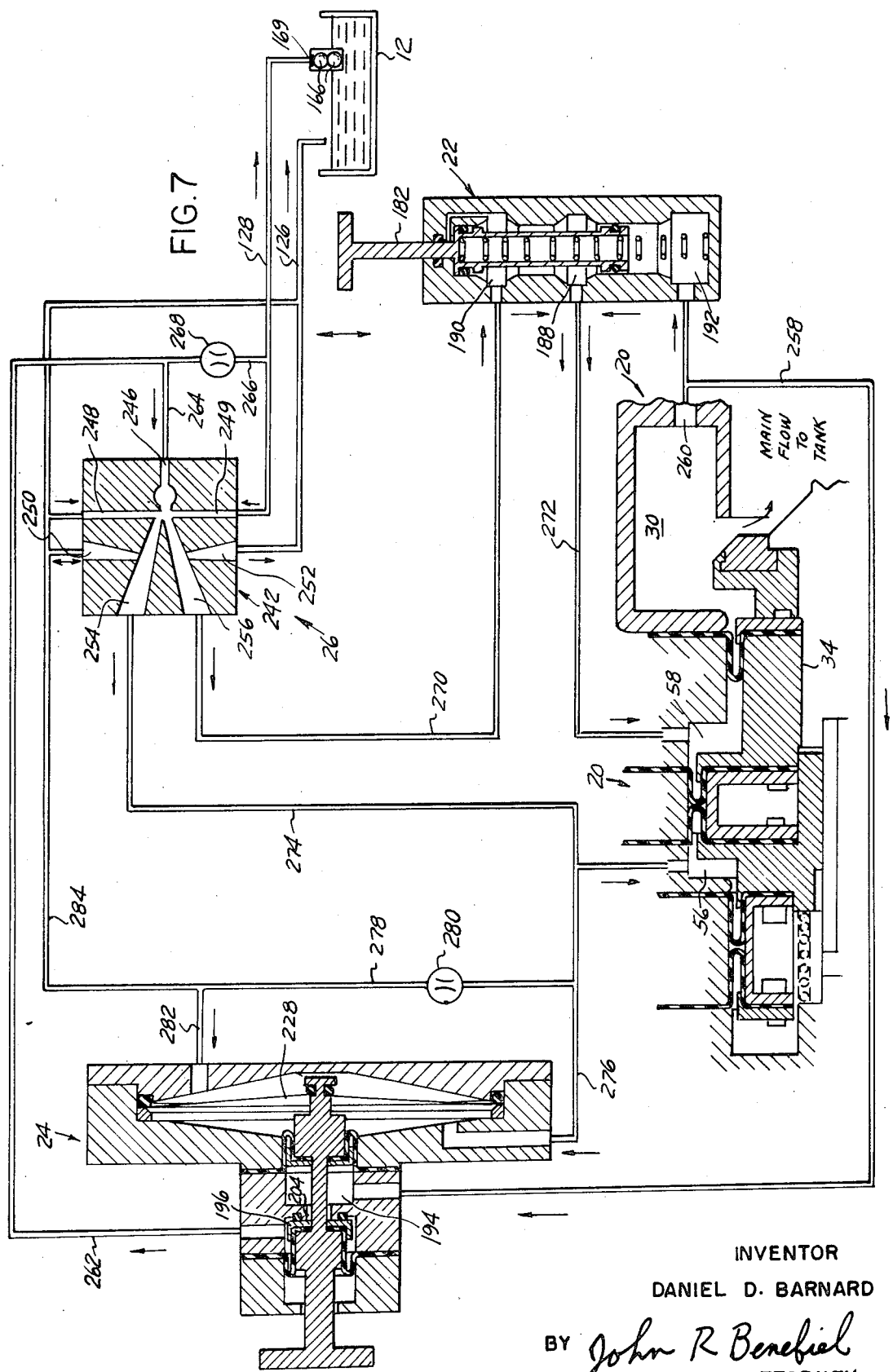

FLOW CONTROL DEVICE WITH A BISTABLE FLUID SWITCH

BACKGROUND OF THE INVENTION

1. Field of the Invention

This invention concerns flow control devices, and more particularly automatic flow control devices utilizing fluidic components.

2. Description of the Prior Art

In many vehicle fueling situations closed-connect fueling would be desirable, in which the fuel tank remains sealed against the ambient atmosphere so as to prevent the entrance of dust and dirt. In such closed-connect situations, it would be necessary to have some means of automatic flow regulation since observance of the fuel level is rendered impossible by the nature of the closed connection.

Existing sensing and shut off devices are of a mechanical type, and sensitivity and reliability could be improved if a fluidic control circuit were substituted therefor.

However, fluidic components often require supply flows which are wasteful of power after they have performed their function in the particular circuit, and also would create a leakage if fluidic component venting were to the vehicle tank, and hence in this context are difficult to incorporate to yield a satisfactory design.

Hence, it is an object of the present invention to provide an automatically operated flow control valve utilizing a fluidic sensing and control circuit.

Another object of the present invention is to provide an arrangement for automatically discontinuing the supply flow to a fluidic element after it has performed its function to thereby eliminate power losses and leakage flow from the circuit.

SUMMARY OF THE INVENTION

These and other objects which will become apparent upon a reading of the following specification and claims are accomplished by providing a jet-on-jet monostable fluid amplifier with a power jet which is switched from its stable outlet to an alternate outlet by a float controlled sensing line, with the fluid signal produced thereby used to operate a main flow valve to discontinue further flow and also to operate a bistable fluid switch that discontinues flow to the fluid amplifier.

BRIEF DESCRIPTION OF THE DRAWINGS

FIG. 2 is a partially sectional view of the nozzle assembly of the present invention.

FIG. 4 is a partially sectional view of the bistable fluid switch assembly contained in the main nozzle assembly.

FIG. 5 is a partially sectional view of the receptacle assembly of the present invention.

FIG. 6 is a view of the section taken along the line 6-6 in FIG. 5.

FIG. 7 is a schematic representation of the fluidic sensing and control circuit of the present invention.

DESCRIPTION OF THE PREFERRED EMBODIMENT

In the following detailed description, certain specific terminology will be referred to for the sake of clarity and a specific embodiment described in order to provide a complete, full understanding of the invention, but it is to be understood that the invention is not so limited and may be practiced in a variety of forms and embodiments.

Figure 1:
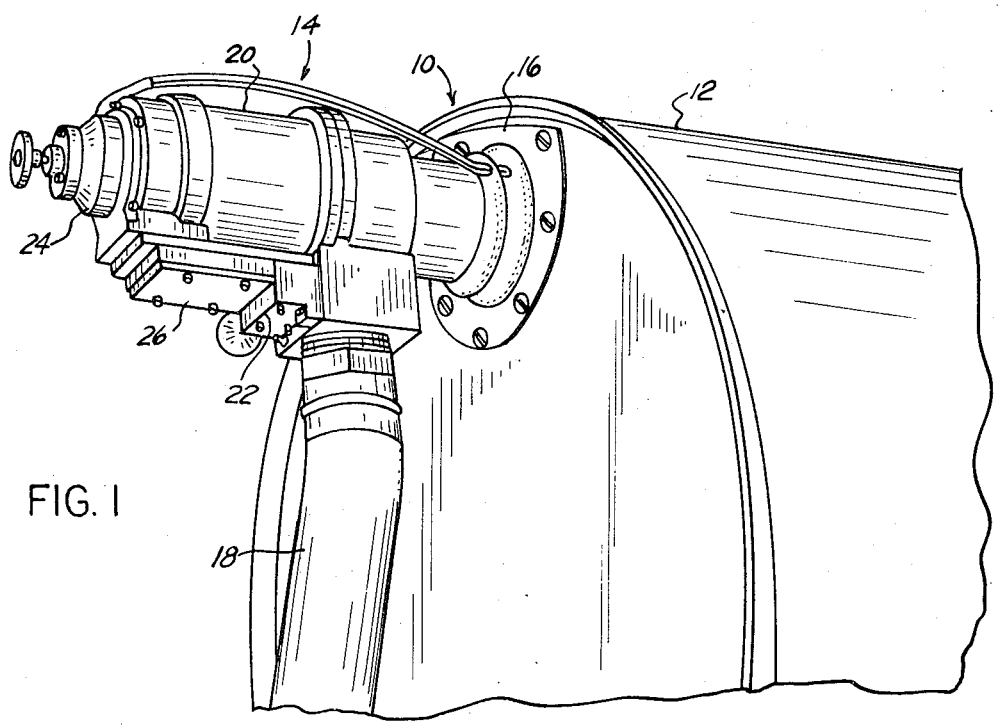
FIG. 1 is a perspective view of a flow control device for the present invention showing a tank filling operation.

Referring to the drawings, and particularly FIG. 1, the flow control device 10 is depicted operatively associated with a tank 12. Flow control device 10 includes a nozzle assembly 14 and a receptacle assembly 16. The nozzle assembly 14 is supplied with liquid such as fuel via line 18 and includes a main valve assembly 20, a manual control valve 22, an operating switch 24, and a fluidic circuit and manifold assembly 26.

Referring to FIG. 2, the main valve assembly 20 is shown in some detail. The main valve assembly 20 includes an inlet passage 28 supplied from line 18 communicating with an annular passage 30, with a valve seat element 32 secured to a piston assembly 34 controlling communication between the annular passage 30 and passage 36.

The valve seat assembly 32 includes a resilient sealing ring 48 secured to a collar 50. The piston assembly 34 is made up of a plurality of spacers 28 and 40 and retainers 36, 42, 44, and 46 which, with the valve seat element 32, are all retained together by means of the stepped shaft 52 passing therethrough and threadedly engaging a retainer 54 which is adapted to be tightened down, securing all these elements together.

Movement of the piston assembly 34 and the associated valve seat 32 is controlled by fluid pressure in annular chambers 56, 58 which are defined by rolling diaphragm members 60, 62, 64, and 65, respectively. These diaphragm elements are clamped between respective spacer and retainer piston elements 36 through 46 and between spacer elements 66, 68, 70, and 72 and pressed between end cap 74 and spacer 76 by means of the bolted connection between the housing members 78 and 80. A bias spring 82 is provided urging the piston to the right as seen in FIG. 2 tends to force the valve seat member 32 so as to close communication between annular passage 30 and passage 36, so that in the absence of a pressure differential in chambers 56 and 58, adequate seat pressure is exerted on the piston assembly 34 to insure sealing of the valve seat 32.

In addition, the bias spring 82 prevents automatic operation in the event very low pump pressures are encountered which may cause malfunction of the fluidic circuit since the pressure differential declines with supply pressure and eventually the spring force will overcome the differential pressure force. In order to balance the effect of pressure in chamber 36 on the piston 34, an annular passage 84 communicating with a chamber 86 defined between the valve end cap 74 and rolling diaphragm 88 is provided.

Fluid in passage 36 passes into opening 90 past spider member 92 into passage 94 and thence into passage 96 formed in nipple member 98 of the receptacle assembly 16 shown in phantom lines.

A quick disconnect coupling consisting of an operating ring 100, spring 102, and a latching bar 104 is utilized, cooperating with a shoulder 106 formed on the nipple member 98. Manipulation of the operating ring 100 to cause axial movement allows the latching bar 104 to be forced away from the shoulder 106 to allow the nozzle assembly 14 to be withdrawn. An O-ring seal 108 is included in order to provide a seal between the nipple member 98 and the nozzle member 110 during filling operations, while a retractable bushing 109, forced to the left to the position shown in FIG. 2 by the nipple 98 during filling provides a seal by means of O-rings 111 and 113 when the nozzle assembly 14 is withdrawn from the receptacle 16.

As this mechanism is well known and commercially available, it is not felt necessary to describe the same in any further detail.

As will hereinafter be explained in more detail, the fluidic control circuit requires a vent passage to the fuel tank 12, as well as a sensing passage to provide a pressure signal when the desired level in the tank has been reached.

The vent passage in this embodiment is provided by use of annular space 112 extending between a pair of centrally located tubes 114 and 116. Tube 114 is supported at one end by means of a manifold vent member 118 disposed on the valve end cap 74 and the other end supported by a spider member 92 via a plug element 120. Passage 112 communicates with a similar passage 122 formed between tubular member 116 and plug 120, with passage 122 communicating with passage 124 formed in a union element 126 secured to plug 120.

A nozzle sensing passage 128 is formed by the inside diameter of the tubular member 116, communicating with chamber 130 formed in the union element 126, normally sealed by a ball 127 cooperating with a shoulder 129.

Vent passage 112 and sensing passage 128 communicate with ports 132 and 134, respectively, which in turn are operatively associated with the bistable fluid switch 24, and the manifold and fluidic circuit assembly 26 in a manner to be hereinafter explained in more detail, while the opposite terminals of these passages communicate with the receptacle assembly 16, also in a manner to be hereinafter described in detail.

FIGS. 5 and 6 depict the details of the receptacle assembly 16 and a phantom line representation of a portion of the nozzle assembly 20 showing the relationship between the vent and sensing lines therewith. As indicated earlier, the main flow from the nozzle passes through nipple 98 around the nipple assembly 133, through openings 135 in valve guide 137, and thence into the tank cavity 138.

Nipple assembly 133 is moveably disposed within the nipple 98, biased to the left as viewed in FIG. 5 by means of a bias spring 139 so that in the absence of nozzle assembly 14 seal 140 engages the inner diameter 142 in nipple 98 to seal the tank cavity 138.

In placing the nozzle assembly 14 into the receptacle assembly 16, the face of the union element 126 engages the face of retainer 144 and moves the assembly axially against the bias spring 138 into the position shown. In this position, the union element 126 is received in a bore 146 in the retainer end 144 and a nipple assembly 133, respectively, and sealed therein by means of O-rings 148 and 150.

In this position, vent passage 124 empties into a clearance space in the bore 146, which in turn communicates with the passage 152 formed in the nipple assembly 133 communicating with the region 99 emptying into the tank cavity 138.

Nozzle sensing passage 128 in communication with a receptacle sensing passage 154 formed by tubes 155 and 157 and a probe 156. In this position, probe 156 displaces the ball 127 to the left as seen in FIG. 5 allowing flow from nozzle sensing passage 128 to pass around the ball 127 through slots 158 formed in the probe 156 and into receptacle sensing passage 154.

As is seen in FIG. 6, tube 157 leads to a float valve 159 and is fixed to a float valve housing 160 which supports a valve member 162 by means of a pin 164. A pair of float balls 166 are retained within the housing 168, when the fuel level in the tank cavity 138 reaches the desired level, the float balls 166 rise, forcing the valve member 162 against the terminus orifice 169 of the tube 157, moving through a clearance 172, thus tending to or blocking the sensing line.

Receptacle assembly 16 is supported in the tank by means of a flange 174 in turn supporting a nipple extension 176, which is slotted at 177 to allow for the axial travel of the nipple assembly 132 and attached float valve assembly 159. The quick change coupling 170 is provided in order to provide a quick release of the nipple member 98.

The application of fluid pressure to chambers 56, 58 which in turn controls the flow of liquid past the valve member 32 is accomplished in the alternative by manual or automatic liquid level sensing control.

Figure 3:
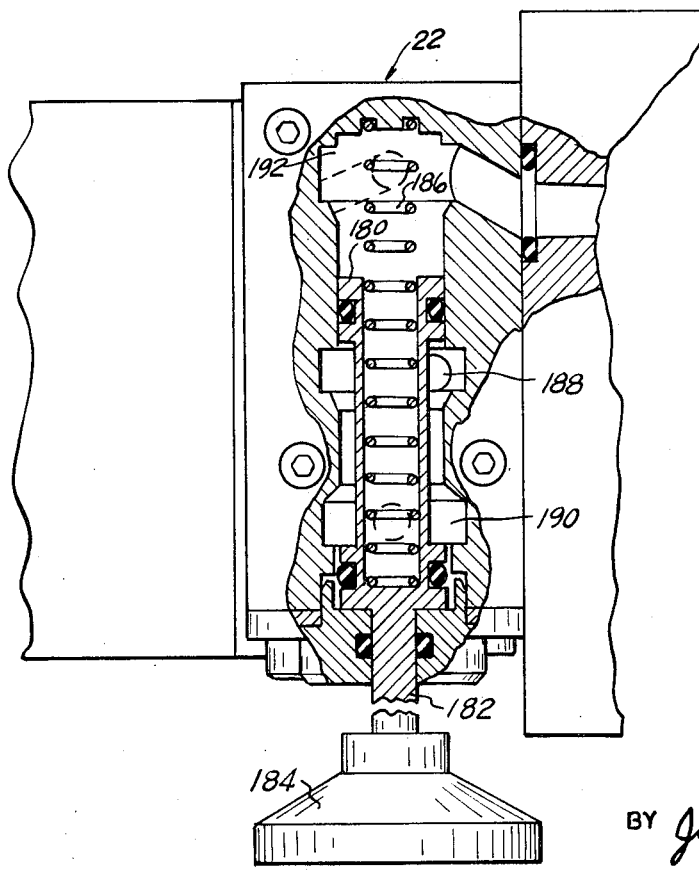
FIG. 3 is a view in partial section taken in the direction of the arrow 3—3 in FIG. 2.

The means for providing manual control includes a manual control valve 22 shown in detail in FIG. 3. This valve includes a valve spool 180 having an attached stem 182 and a knob 184 with a biasing spring 186 causing the valve spool 180 to assume the position shown. In this position, port 188 and port 190 are in communication with each other while upon the depression of the stem 182 manually, port 192 and port 188 are put into communication with each other, sealing port 188 from port 190.

In accomplishing the automatic control of the main valve assembly 20 a unique bistable fluid operated fluid switch 24 is provided as shown in detail in FIG. 4. The bistable switch assembly 24 controls communication between a pair of chambers 194 and 196 defined by rolling diaphragm seals 198 and 200, and a central partition 202 formed in the housing member 204. Partition 202 is formed with an opening 205 therein which is adapted to be alternately opened and closed by valve assembly 206, thereby controlling communication between the chambers 194 and 196. The rolling diaphragm seals 198 and 200 are clamped between end cap 208, housing 204, and housing member 210.

The valve assembly 206 includes an operating rod 212 having a knob 214 threaded thereto which serves to compress the spacer 216, diaphragm 198, retainer 214, and valve seat 224, spacers 218, 220, and diaphragm seal 200 against the shoulder 222 formed on the end of the operating rod 212. This serves to clamp and retain these elements thereon.

In the position shown, valve seat 216 is abutting partition 202 to prevent communication between the chambers 194 and 196, and as the valve assembly is moved to the left as seen in FIG. 4, communication through opening 204 is created between the chambers 194 and 196.

This movement can be either accomplished manually by manipulation of the valve operating rod 212 or automatically by the effect of the differential fluid pressure in a chamber 226.

Chamber 226 is divided into two separate chambers 234, 236 by means of a conical bistable Belleville spring 228 disposed therein and sealed at 230 and 231. The Belleville spring 228 is secured to the operating rod 212 by means of a threaded connector 232. Fluid pressure is admitted at each respective chamber 234, 236, by means of passages 238, 240, respectively. Momentary pressure differentials of a sufficient level created across the Belleville washer 228 by fluid pressure introduced in passages 238 and 240 will cause it to assume either of two stable positions, one as shown in FIG. 4, the other of which with the cone dished to the left. This "snap action" phenomenon is well known in itself and provides a mechanical bistable mode of operation.

The travel of the Belleville spring 228 is selected so that in the position shown, a spring force is exerted to the right on the operating rod 212 so as to provide a mechanical seating force on the valve seat 216 to insure sealing in the passage 204.

For the sake of clarity, the fluid interconnections between the main valve assembly 20, the manual control valve 22, and the bistable operating switch 24 as well as the jet-on-jet monostable fluid amplifer utilized in the present invention are shown schematically in FIG. 7. As seen in FIG. 7, the control circuit includes the jet-on-jet fluidic amplifier 242. This element is a well known fluidic component and includes a supply port 246, a control port 248, a bias control port 249, a pair of vents 250 and 252, and a pair of outlet legs 254 and 256. This amplifier 242 is arranged to be monostable to the outlet 256, that is the power jet of supply flow via port 246 is attracted to the outlet leg 256 and tends to exit solely therefrom in the absence of upsetting control pressures applied at control port 248. This characteristic may be provided by proper design of the wall contours or by varying the respective areas of bias and control ports 248 and 249, in a manner well known in the fluidic art.

Inasmuch as this type of fluidic element is in itself well known, it is not felt necessary to describe and explain the same in any greater detail.

Supply port 246 is supplied with fluid under pressure via line 258 communicating with outlet port 260, in turn communicating with annular chamber 30 supplied from the main pump (not shown). Passage 258 is connected with the chamber 194 in the operating switch 24 and communicates with chamber 196 via opening 204, with a passage 262 which supplies port 246 via branch 264. Passage 262 also communicates with nozzle sensing passage 128 and control port 248 via line 266 containing a restriction 268.

Monostable outlet leg 256 is connected to the manual control valve 22 by a passage 270 to port 190 which in the normally open position allows communication via port 188 and line 272 with chamber 58 of the main valve assembly 20. The opposite leg of the output of the fluid amplifier 242 is connected to the opposing chamber 56 of the nozzle assembly via line 274. Line 274 is also connected to both sides of the chamber 226 via branches 276, 278, and 282, with branch 278 containing a restriction 280.

Vent port 256, and bias control port 249 are also connected to the vent line 126 via branch 284 downstream of the operating switch 24.

OPERATION

Having placed the nozzle assembly into the receptacle assembly 16, the operating switch 24 is manipulated to initiate automatic filling by withdrawing the operating rod 212, causing the Belleville spring 228 to snap to the left as viewed in FIG. 4. This allows the chamber 194 and 196 to be in communication with each other. In this position, supply pressure in region 30 is communicated to supply port 246 of the fluidic amplifier 242 via the chambers 194 and 196, with the power jet issuing from the monostable outlet leg 256 and passing via line 270 through the manual control valve port 190 and then to chamber 58 via port 188 and line 272.

At the same time, lines 284, 278, 276, and 274 are at tank pressure due to venting of the outlet 256 at 250, hence chamber 56 will be at sump or tank pressure. The resulting pressure differential across the piston 34 will cause the piston 34 to move to the left against the bias spring 82 unseating valve member 32, and allowing flow from annular passage 30 to pass into the tank cavity 138.

At the same time bias port 249 is supplied with fluid at tank pressure since it is flooded with the vent flow while control port 248 is supplied with fluid at a pressure determined by pump supply pressure orifice 268, pressure loss in the various lines as well as orifice 169. The respective areas of bias and control ports 249 and 248 and the value of the pressure at the control port 248 are selected so as to insure monostable operation with flow normally issuing primarily from outlet leg 256 throughout the operating range of the system.

When the level in the tank cavity 130 reaches a desired level, float valve 172 operates to close the terminus orifice 169, and connected nozzle sensing passage 128 by means of the float balls 166. This causes a consequent rise in pressure in line 128 in the associated control port 248 which in turn causes switching of the jet from outlet leg 256 to outlet leg 254 providing a fluid pressure indicator signal that the predetermined liquid level has been reached. This causes a pressure increase in chamber 56 and a pressure decrease in chamber 58, in turn causing the piston 34 to stroke to the right to shut off flow to the tank cavity 138.

At the same time, a pressure differential is created across the Belleville spring 228 by means of line 276, orifice 280, line 278, line 282, line 284 causing the Belleville spring 228 to snap to the right to the position shown in FIG. 4, and thereby cause supply flow to the fluidic amplifier 242 to be discontinued. This discontinuance of the supply flow eliminates the venting and consequent leakage and power losses which would occur if the bistable fluid switch were not provided.

In the event manual operation is desired or necessary due to low pump pressure, the manual control valve 22 can be utilized by depressing valve stem 182, which causes port 192 and 188 to be in direct communication, and supplying pump pressure from annular chamber 30 directly to chamber 58, causing piston 34 to stroke to the open position. Since the valve spool 182 is spring biased upwardly as viewed in FIG. 7, continuous manual depression is required in order to continue filling of the tank under manual control.

Retraction of the operating ring 100 releases the nozzle assembly 20 and allows movement of the various nozzle and receptacle sealing surfaces into mutual engagement thereby insuring a dry break.

While this system has been described in the context of a fueling nozzle, and has particular advantages when used therein, the invention is not so limited and may be practiced in a variety of contexts in which automatic liquid level control is desired.

Similarly, the bistable fluid operated switch is useful in many fluidic circuits since there are many situations wherein a fluidic element needed only once in the control cycle and having functioned once in a system continues to be a source of power loss since the supply flow continues thereto.

What is claimed is:

1. A flow control device for controlling filling of a cavity with fluid comprising:

main passage means for directing fluid flow into said cavity;

main valve means controlling flow through said main passage means;

liquid level sensing means including a sensing passage means, including a passage extending within said main passage means, means for creating fluid flow in said sensing passage into said cavity through said passage extending within said main passage during filling operations, and means for restricting flow in said sensing passage means when the fluid level in said cavity reaches a predetermined level; and control means for controlling said main valve means in response to said restriction of said sensing line including a fluidic amplifier comprising a jet-on-jet device having a supply jet and a pair of outlets with said supply jet being monostable with respect to one of said outlets, and means varying flow through said fluidic amplifier including means switching said supply jet from said monostable outlet to said other outlet, and wherein said control means further includes means causing said main valve means to discontinue flow in said main passage means upon switching of said supply jet to said other outlet, said fluidic amplifier further including vent passages associated with each outlet, and wherein said control means further includes a vent passage extending so as to be directed into said cavity during filling operations, whereby vent flow is directed into said cavity.

2. The device of claim 1 wherein said sensing passage and said vent passage include a pair of concentric tubes supported in said main passage, with the internal diameter of one tube and the annular clearance between the two tubes creating the sensing and vent passages.

3. The device of claim 1 wherein said restricting means includes a float operated valve means in said cavity and also includes means for blocking said sensing passage by said float operated valve means upon attainment of said level in said cavity.

4. A flow control device for controlling filling of a cavity with fluid comprising:

main passage means for directing fluid flow into said cavity;

main valve means controlling flow through said main passage means;

liquid level sensing means including a sensing passage means, including a passage extending within said main passage means, means for creating fluid flow in said sensing passage into said cavity through said passage extending within said main passage during filling operations, and means for restricting flow in said sensing passage means when the fluid level in said cavity reaches a predetermined level; and control means for controlling said main valve means in response to said restriction of said sensing line including a fluidic amplifier comprising a jet-on-jet device having a supply jet and a pair of outlets with said supply jet being monostable with respect to one of said outlets, and means varying flow through said fluidic amplifier including means switching said supply jet from said monostable outlet to said other outlet, and wherein said control means further includes means causing said main valve means to discontinue flow in said main passage means upon switching of said supply jet to said other outlet and wherein said control means also includes fluid switch means discontinuing fluid flow to said fluidic amplifier in response to said switching of said supply jet flow to said other outlet.

5. The device of claim 4 wherein said fluid switch means includes an element having two stable positions one of which the member will assume in the absence of moving forces above a predetermined level, and further includes an operatively associated valve means, allowing fluid flow to said fluid amplifier in one of said stable positions and preventing fluid flow to said fluid amplifier in the other of said stable operating positions.

6. The device of claim 5 wherein said fluid switch means further includes means moving said member to said other position by said other fluidic amplifier outlet.

7. The device of claim 5 wherein said member is a Belleville spring dished in one direction and said other position is with said Belleville spring dished in the opposite direction.

8. The device of claim 7 wherein said fluid switch means includes means mounting the periphery of said Belleville spring against axial movement, and further includes means for applying an axial force to said Belleville spring in response to said flow from said other outlet of said fluidic amplifier to cause said Belleville spring to be inverted to said other position.

9. The device of claim 8 wherein said means for applying an axial force to said Belleville spring includes a fluid pressure chamber defined in part by said Belleville spring, and also includes means for providing a fluid connection from said other outlet and said fluid pressure chamber, whereby a fluid pressure is applied to said Belleville spring in response to said switching to said other outlet.

10. The device of claim 8 further including an operating rod connected to said Belleville spring to permit manual movement of said Belleville spring to said one or the other stable positions.

11. A fluidic circuit comprising:

a fluidic element comprising a jet-on-jet fluidic amplifier having a supply inlet and a pair of outlets and means varying said flow from said supply inlet to said pair of outlets including means switching said supply flow from one to the other of said outlets;

control means discontinuing said supply flow to said fluidic element in response to said switching of flow from said inlet to one of said outlets from flow to the other of said outlets, wherein said control means includes bistable fluid switch means having an operating element comprising a Belleville spring which is positioned in one or the other of a pair of oppositely dished positions in the absence of moving forces acting thereon above a predetermined value, and further includes valve means controlling fluid flow to said supply inlet in response to movement of said operating element from one of said stable positions to the other, and operating means causing said operating element to move to a stable position corresponding to discontinuance of fluid flow to said supply inlet by said valve means.

12. The circuit of claim 11 wherein said operating means includes at least one fluid pressure chamber defined in part by said Belleville spring, and further includes fluid pressure control means for creating a fluid pressure differential across said Belleville spring to cause movement from one dished position to the reverse dished position.

13. The circuit of claim 11 wherein said valve means includes an operating rod drivingly connected to said Belleville spring, and further including means varying said fluid flow through to said supply inlet in response to movement of said operating rod with said Belleville spring.

14. The circuit of claim 11 further including a manual control element connected to said operating rod and accessible for manual movement of said operating rod, whereby said switch may be manually manipulated to each bistable position.

15. The circuit of claim 11 wherein said valve means further includes an operating rod connected to said Belleville spring and also includes means varying said flow in response to movement of said operating rod with said Belleville spring.

16. The circuit of claim 11 further including a manual control element connected to said operating rod and accessible for manual movement, whereby said fluid switch is operable both manually and by said fluid pressure control means.

* * * * *